(12) United States Patent
Lin

(10) Patent No.: US 7,386,169 B2
(45) Date of Patent: Jun. 10, 2008

(54) METHOD FOR EDGE DETECTION AND CONTOUR STROKE GENERATION

(75) Inventor: Yu-Ru Lin, Taoyuan (TW)

(73) Assignee: Corel TW Corp., Taipei (TW)

( * ) Notice: Subject to any disclaimer, the term of this patent is extended or adjusted under 35 U.S.C. 154(b) by 836 days.

(21) Appl. No.: 10/832,263

(22) Filed: Apr. 27, 2004

(65) Prior Publication Data

US 2005/0238234 A1    Oct. 27, 2005

(51) Int. Cl.
*G06K 9/34* (2006.01)

(52) U.S. Cl. .................................... 382/173

(58) Field of Classification Search ............. 382/173, 382/175, 177, 181, 197, 199, 202, 203

See application file for complete search history.

(56) References Cited

U.S. PATENT DOCUMENTS

| 5,790,692 A * | 8/1998 | Price et al. | 382/133 |
| 5,859,929 A * | 1/1999 | Zhou et al. | 382/175 |
| 6,385,332 B1 * | 5/2002 | Zahalka et al. | 382/128 |
| 6,898,316 B2 * | 5/2005 | Zhou | 382/190 |

* cited by examiner

*Primary Examiner*—Jose L. Couso
(74) *Attorney, Agent, or Firm*—Birch, Stewart, Kolasch, Birch, LLP

(57) ABSTRACT

A method for contour stroke generation. First, edge pixels of an image are detected. The connected edge pixels are traced to generate non-branched edges. Each non-branched edge represents a list of connected edge pixels without branches. Thereafter, the non-branched edges are clustered. Then, the non-branched edges are transformed into curves, and the curves are drawn with a series of footprints to generate contour strokes of the image.

18 Claims, 5 Drawing Sheets

METHOD FOR EDGE DETECTION AND CONTOUR STROKE GENERATION

BACKGROUND OF THE INVENTION

1. Field of the Invention

The present invention relates to image processing and particularly to an edge detection method and a method for contour stroke generation.

2. Description of the Related Art

Edge detection is arguably the most important operation in low-level computer vision. Many edge detection mechanisms are currently available, and gradient-based edge detectors are among the most popular. The results derived from conventional detection, however, tend to show artifacts such as a large spurious response. Additionally, few of the edge detection mechanisms provide inventive steps to transform detected edge pixels into contour curves suitable for further processing, for example, simulating artwork, such as illustrations.

SUMMARY OF THE INVENTION

It is therefore an object of the present invention to provide an edge detection method that enhances conventional edge detection techniques.

Another object of the present invention is to provide a method for contour stroke generation that generates contour curves and renders contour strokes.

To achieve the above objects, the present invention provides an edge detection method and a method for contour stroke generation. According to one embodiment of the invention, an edge detection method is provided. First, edge pixels of an image are detected. The connected edge pixels are traced to generate non-branched edges. Each non-branched edge represents a list of connected edge pixels without branches. The non-branched edges are then clustered.

In edge clustering, any two non-branched edges are connected if the distance of respective end pixels is within a distance threshold, any non-branched edge is removed if a corresponding edge length is shorter than a length threshold, and any non-branched edge is divided if a corresponding edge length is greater than a maximum length threshold.

According to another embodiment of the invention, a method for contour stroke generation is provided. First, edge pixels of an image are detected. The connected edge pixels are traced to generate non-branched edges. Each non-branched edge represents a list of connected edge pixels without branches. Thereafter, the non-branched edges are clustered. The non-branched edges are then transformed into curves, and the curves are drawn with a series of footprints to generate contour strokes of the image.

Similarly, any two non-branched edges are connected if the distance of respective end pixels is within a distance threshold, any non-branched edge is removed if a corresponding edge length is shorter than a length threshold, and any non-branched edge is divided if a corresponding edge length is greater than a maximum length threshold.

In curve transformation, points are sampled from the non-branched edges. Curves are drawn using the sample points as control points.

The footprints have a fixed or variable size, and have a simple shape or resizable texture to simulate different kinds of brushes.

The above-mentioned method may take the form of program code embodied in tangible media. When the program code is loaded into and executed by a machine, the machine becomes an apparatus for practicing the invention.

BRIEF DESCRIPTION OF THE DRAWINGS

The aforementioned objects, features and advantages of the invention will become apparent by referring to the following detailed description with reference to the accompanying drawings, wherein.

DETAILED DESCRIPTION OF THE INVENTION

Figure 1:
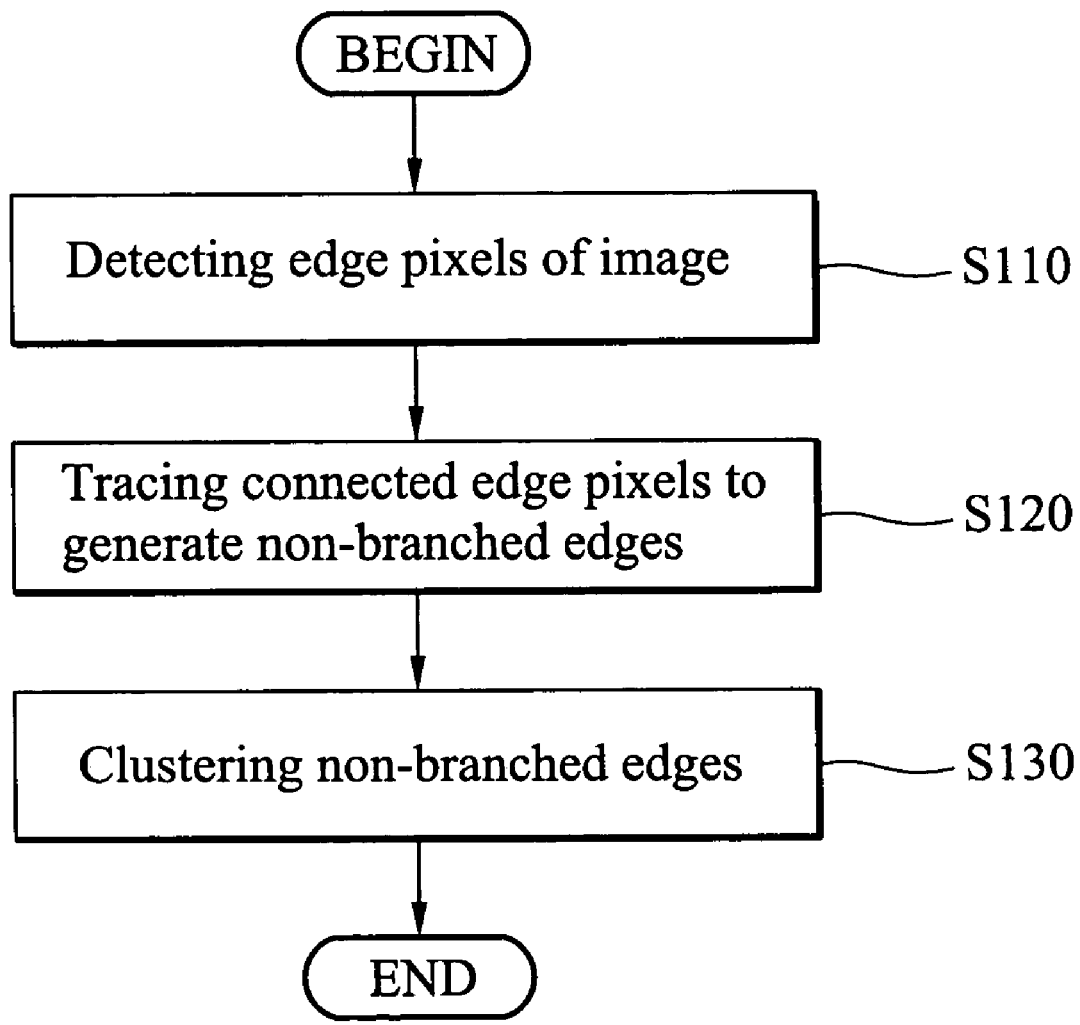
FIG. 1 is a flowchart showing an edge detection method according to one embodiment of the present invention.

FIG. 1 is a flowchart showing an edge detection method according to one embodiment of the present invention. The edge detection method comprises three processes, edge detection, non-branched tracing, and edge clustering.

First, in step S110, edge pixels of an image are detected. The edge pixels are detected according to a gradient-based edge detection procedure, such as Canny Edge Detection. The edge detection procedure includes the steps of estimating gradient vector, non-maxima suppression and hysteresis threshold, thus outputting edge pixels of an image. The detailed description of the above edge detection procedure is omitted here. It is understood that any other effective edge detection procedure can be used in the present invention.

Then, in step S120, the connected edge pixels are traced to generate non-branched edges. In non-branched edge tracing, a container EPList stores a list of connected edge pixels without branches, for example, each container EPList represents a non-branched edge. The non-branched edge tracing process is described as follows.

First, a starting pixel s is selected from the edge pixels E according to a corresponding gradient magnitude generated by the gradient-based edge detection procedure. The starting pixel s is then removed from the edge pixels E, and the starting pixel s is added to a container EPList with an initial marking value M(s)=0, and a maximum marking value Max(M) is set as the marking value M(s) (Max(M)=M(s)).

Then, each connected pixel p' of each pixel p in the container EPList is checked. If the connected pixel p' is in the edge pixels E, the connected pixel p' is removed from the edge pixels E, the connected pixel p' is added to the container EPList with a marking value M(p')=M(p)+1, and the maximum marking value Max(M) is set as the marking value M(p') (Max(M)=M(p')) until all pixels in the container EPList are processed.

Thereafter, the container EPList is checked for the last pixel p, and the pixel p is removed from the container EPList if the corresponding marking value M(p) is less than the maximum marking value Max(M) (M(p)<Max(M)) until the marking value M(p) equals the maximum marking value Max(M) (M(p)=Max(M)). That is the last pixel p with the marking value M(p) equaling the maximum marking value Max(M) is retained in the container EPList.

Then, the container EPList is checked for the next pixel p' of the pixel p in reverse order. The pixel p' is removed from the container EPList if the corresponding marking value M(p') is not equal to the marking value M(p) minus one (M(p')≠M(p)−1). That is the closest pixel p' with the marking value M(p) equaling the marking value M(p) minus one is retained in the container. EPList. Then, the container EPList is further checked for the next pixel of the pixel p' in reverse order in the same manner until the next pixel is the first pixel in the container EPList.

Figure 2A:
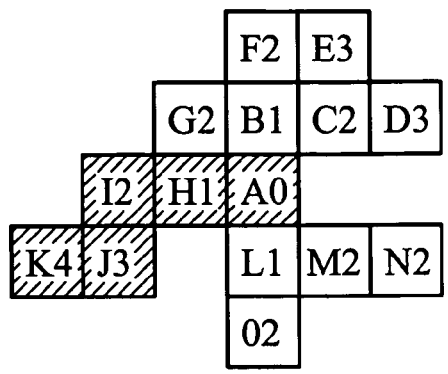
FIGS. 2A~2C show an example of non-branched edge tracing.
Figure 2B:
Figure 2C:

FIGS. 2A~2C show an example of a non-branched edge tracing connected on four sides. FIG. 2A shows connected edge pixels A, B, C, . . . , O in an image. FIG. 2B shows the container EPList after each connected pixel p' is checked and added to the container EPList. The subsequent number of each pixel mark represents the corresponding marking value. Finally, the container EPList represents a non-branched edge including a list of connected edge pixels A, H, I, J and K without branches as shown in FIG. 2C. It is understood that the present invention can also use a non-branched edge tracing connected on 8 sides.

Thereafter, in step S130, the non-branched edges are clustered. In the edge clustering process, any two non-branched edges are connected if the distance of respective end pixels is within a distance threshold, and any non-branched edge is removed if a corresponding edge length is shorter than a length threshold. Additionally, any non-branched edge is divided if a corresponding edge length is greater than a maximum length threshold. It is understood that the distance threshold, the length threshold and the maximum length threshold can be set in advance, or via a user interface. After edge clustering, complete, continuous and non-branched edges can be generated, and short edges comprising noise and artifacts, such as spurious responses can be reduced, thereby improving the quantity of detected edges, and enhancing conventional edge detection procedures.

Figure 3:
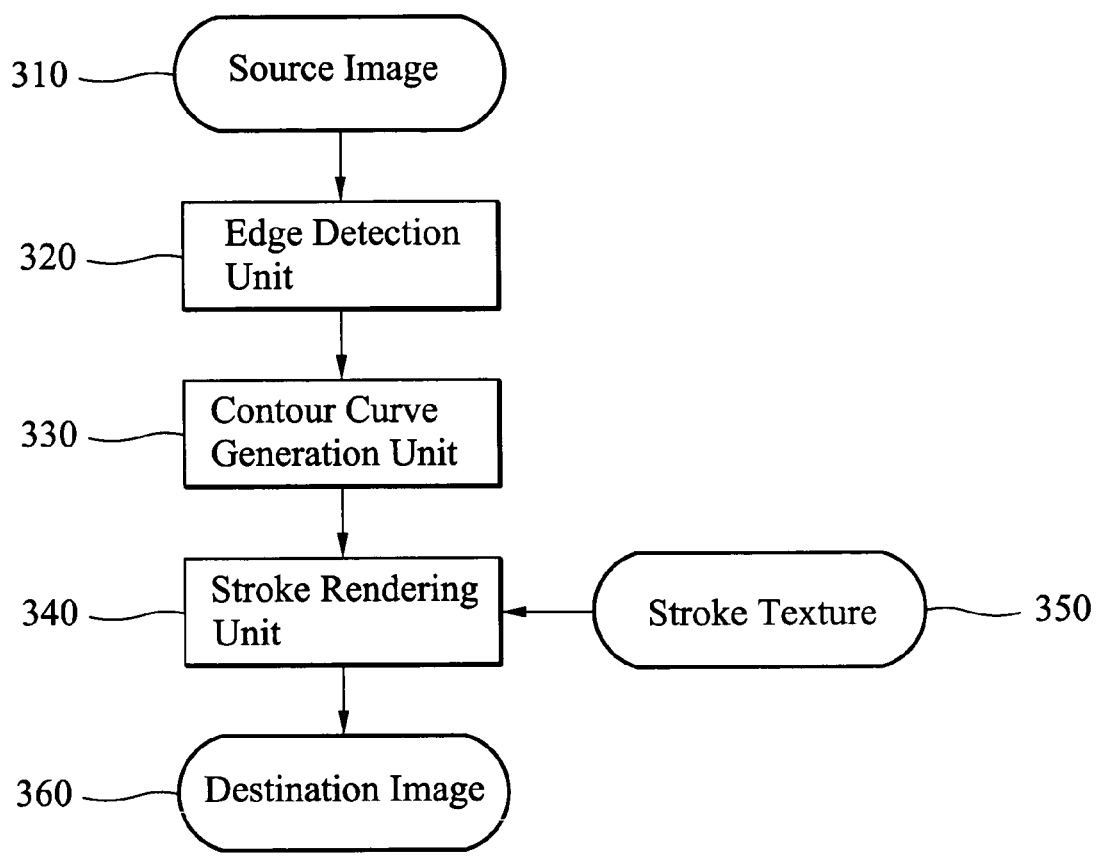
FIG. 3 is a schematic diagram illustrating the system for contour stroke generation according to one embodiment of the present invention.

FIG. 3 is a schematic diagram illustrating the system for contour stroke generation according to one embodiment of the present invention. The system includes an edge detection unit 320, a contour curve generation unit 330, and a stroke rendering unit 340. The edge detection unit 320 detects edge pixels of a source image 310 using an edge detection procedure. The contour curve generation unit 330 generates contour curves according to the edge pixels. The stroke rendering unit 340 draws contour strokes according to the contour curves with a stroke texture 350, thereby obtaining a destination image 360.

Figure 4:
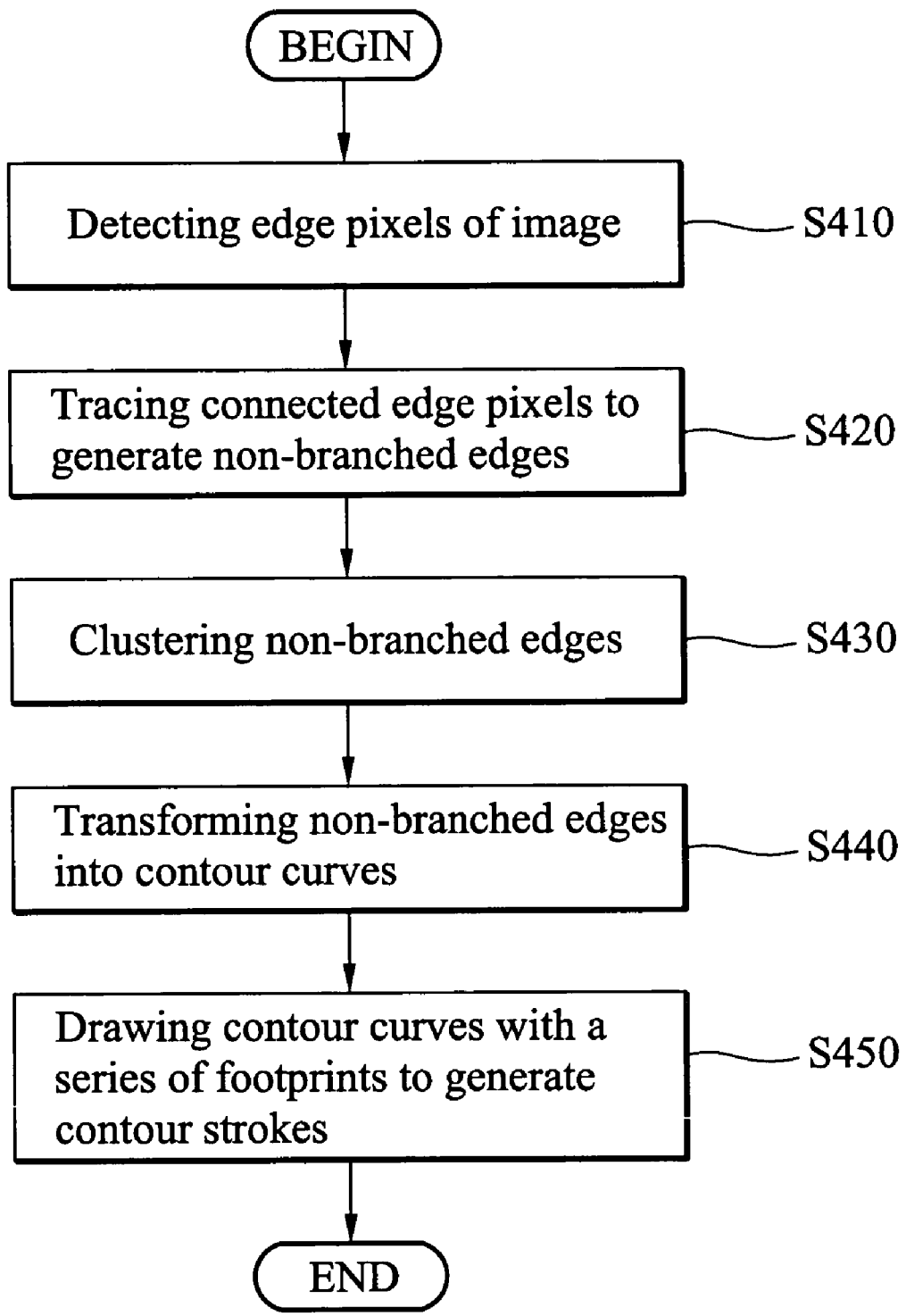
FIG. 4 is a flowchart showing a method for contour stroke generation according to one embodiment of the present invention.

FIG. 4 is a flowchart showing a method for contour stroke generation according to one embodiment of the present invention. The method for contour stroke generation comprises three processes, edge detection (S410), contour curve generation (S420~S440), and stroke rendering (S450).

First, in step S410, edge pixels of an image are detected. The edge pixels are detected according to a gradient-based edge detection procedure. It is understood that any other effective edge detection procedure can be used in the present invention.

Then, in step S420, the connected edge pixels are traced to generate non-branched edges. In non-branched edge tracing, a container EPList stores a list of connected edge pixels without branches, for example, each container EPList represents a non-branched edge. The non-branched tracing process is similar to step S120, and omitted here.

Then, in step S430, the non-branched edges are clustered. Similarly, any two non-branched edges are connected if the distance of respective end pixels is within a distance threshold, any non-branched edge is removed if a corresponding edge length is shorter than a length threshold, and any non-branched edge is divided if a corresponding edge length is greater than a maximum length threshold. It is understood that the distance threshold, the length threshold and the maximum length threshold can be set in advance, or by users via a user interface.

Thereafter, in step S440, the non-branched edges are transformed into contour curves. In curve transformation, points are first sampled from the non-branched edges, and curves are drawn using the sample points as control points of a curve formula. The sample frequency determines the smoothness of generated curves. In the embodiment, a cubic spline interpolation method, such as cardinal spline method is used to generate curves. Cubic polynomials offer a reasonable compromise between flexibility and speed of computation. Given a set of control points, cubic interpolation splines are obtained by fitting the input points with a piecewise cubic polynomial curve that passes through every control point. Cardinal splines are interpolated piecewise cubics with specified endpoint tangents at the boundary of each curve section. For a cardinal spline, the value for the slope at a control point is calculated from the coordinates of the two adjacent control points. A cardinal spline section is completely specified with four consecutive control points. The middle two control points are the section endpoints, and the other two points are used in the calculation of the endpoint slopes. It is understood that any other curve generation method can be used in the present invention.

Then, in step S450, the curves are drawn with a series of fixed or variable size footprints to generate contour strokes with fixed or variable width. It is understood that the footprints can be a simple shape or resizable texture to simulate different kinds of brushes. Similarly, the size, shape and texture of the footprints can be set by users via a user interface provided by the system.

Figure 5:
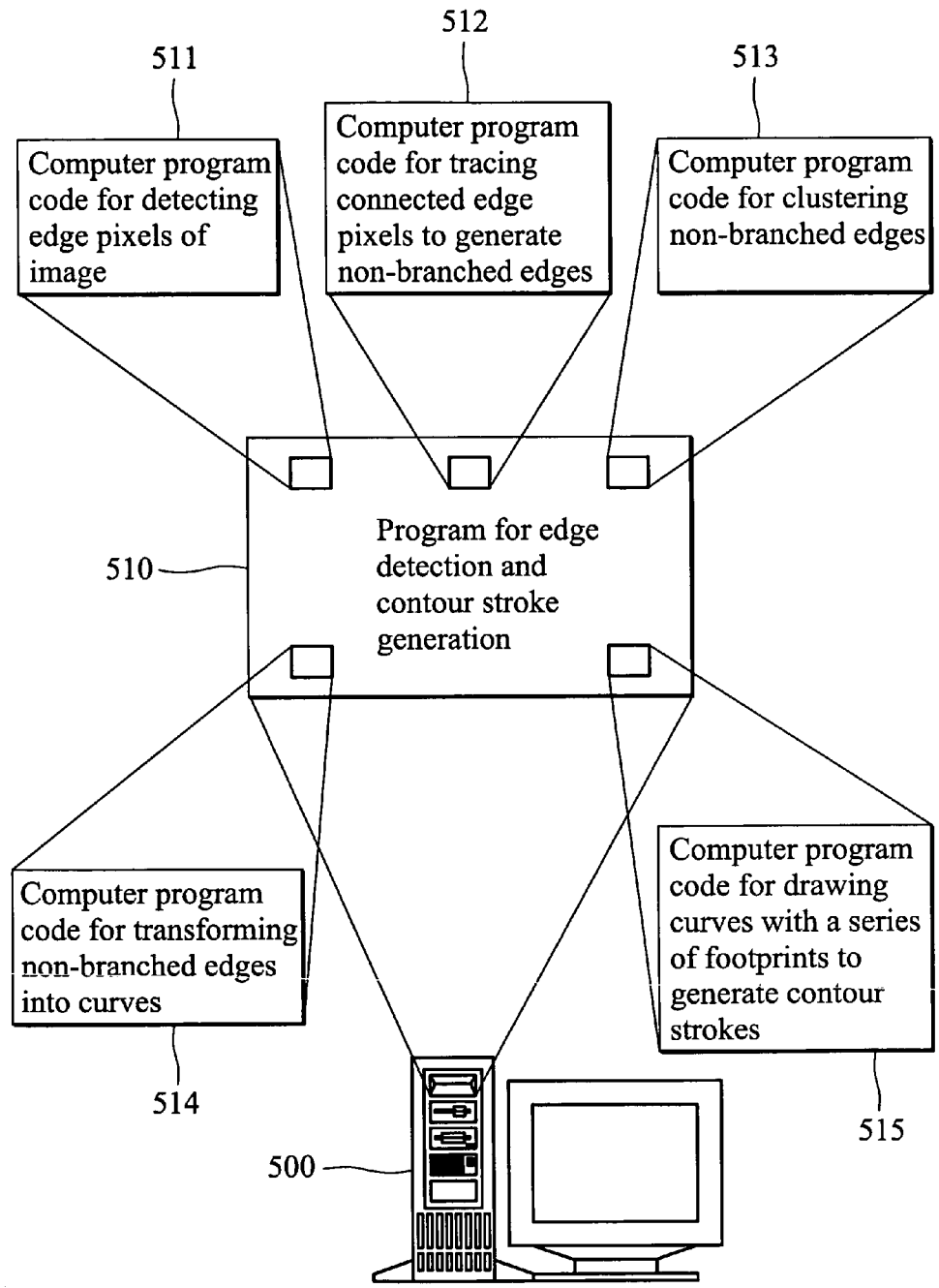
FIG. 5 is a schematic diagram illustrating a storage medium for storing a computer program for execution of the edge detection method and the method for contour stroke generation according to one embodiment of the present invention.

FIG. 5 is a diagram of a storage medium for storing a computer program providing the edge detection method and the method for contour stroke generation according to the present invention. The computer program product comprises a storage medium 510 having computer readable program code embodied in the medium for use in a computer system 500, the computer readable program code comprises at least computer readable program code 511 detecting edge pixels of an image, computer readable program code 512 tracing the connected edge pixels to generate non-branched edges, computer readable program code 513 clustering the non-branched edges, computer readable program code 514 transforming the non-branched edges into curves, and computer readable program code 515 drawing the curves with a series of footprints to generate contour strokes of the image.

The present invention thus provides an edge detection method that enhances conventional edge detection techniques. The present invention also provides a mechanism for transforming detected edge pixels into contour curves and rendering as contour strokes. The smoothness and length of generated contour curves are adjustable. The width of contour strokes is adjustable and the stroke texture can be applied to simulate the style of various images.

The method and system of the present invention, or certain aspects or portions thereof, may take the form of program code (i.e., executable instructions) embodied intangible media, such as floppy diskettes, CD-ROMS, hard drives, or any other machine-readable storage medium, wherein, when the program code is loaded into and executed by a machine, such as a computer, the machine becomes an apparatus for practicing the invention. The method and systems of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to application specific logic circuits.

Although the present invention has been described in its preferred embodiments, it is not intended to limit the invention to the precise embodiments disclosed herein. Those skilled in this technology can still make various alterations and modifications without departing from the scope and spirit of this invention. Therefore, the scope of the present invention shall be defined and protected by the following claims and their equivalents.

What is claimed is:

1. An edge detection method, comprising the steps of:
   detecting edge pixels of an image;
   tracing the connected edge pixels to generate non-branched edges; and
   clustering the non-branched edges,
   wherein tracing of non-branched edges further comprises the steps of:
   selecting a starting pixel s from the edge pixels E;
   removing the starting pixel s from the edge pixels E, adding the starting pixel s to a container EPList with an initial marking value M(s)=0, and setting a maximum marking value Max(M)=M(s);
   for each pixel P in the container EPList,
   checking each connected pixel p' of the pixel p;
   removing the connected pixel p' from the edge pixels E, adding the connected pixel p' to the container EPList with a marking value M(p')=M(p)+1, and setting the maximum marking value Max(M)=M(p') if the connected pixel p' is in the edge pixels E; and repeating checking and removal for each pixel p until all pixels in the container EPList are processed;
   checking the last pixel p from the container EPList, removing the pixel p from the container EPList if M(p)<Max(M), and repeating checking and removal for each pixel p until M(p)=Max(M); and
   checking the next pixel p' of the pixel p from the container EPList in the backward order, removing the pixel p' from the container EPList if M(p')≠Max(p)−1, and repeating checking and removal for each pixel p' until the next pixel is the first pixel in the container EPList.

2. The method of claim 1 wherein the edge pixels are detected according to a gradient-based edge detection procedure.

3. The method of claim 1 wherein the starting pixel s is selected according to a corresponding gradient magnitude.

4. The method of claim 1 wherein clustering of the non-branched edges further comprises connecting any two non-branched edges if the distance of respective end pixels is within a distance threshold.

5. The method of claim 1 wherein clustering of the non-branched edges further comprises removing any non-branched edge if a corresponding edge length is shorter than a length threshold.

6. The method of claim 1 wherein clustering of the non-branched edges further comprises dividing any non-branched edge if a corresponding edge length is greater than a length threshold.

7. A method for contour stroke generation, comprising the steps of:
   detecting edge pixels of an image;
   tracing the connected edge pixels to generate non-branched edges;
   clustering the non-branched edges;
   transforming the non-branched edges into curves; and
   drawing the curves with a series of footprints to generate contour strokes of the image, wherein the footprints have a specific size of a simple shape or resizable texture to simulate different kinds of brushes.

8. The method of claim 7 wherein the edge pixels are detected according to a gradient-based edge detection procedure.

9. The method of claim 7 wherein tracing of non-branched edges further comprises the steps of:
   selecting a starting pixel s from the edge pixels E;
   removing the starting pixel s from the edge pixels E, adding the starting pixel s to a container EPList with an initial marking value M(s)=0, and setting a maximum marking value Max(M)=M(s);
   for each pixel p in the container EPList,
   checking each connected pixel p' of the pixel p;
   removing the connected pixel p' from the edge pixels E, adding the connected pixel p' to the container EPList with a marking value M(p')=M(p)+1, and setting the maximum marking value Max(M)=M(p') if the connected pixel p' is in the edge pixels E; and
   repeating checking and removal for each pixel p until all pixels in the container EPList are processed;
   checking the last pixel p from the container EPList, removing the pixel p from the container EPList if M(p)<Max(M), and repeating checking and removal for each pixel p until M(p)=Max(M); and
   checking the next pixel p' of the pixel p from the container EPList in the backward order, removing the pixel p' from the container EPList if M(p')≠Max(p)−1, and repeating checking and removal for each pixel p' until the next pixel is the first pixel in the container EPList.

10. The method of claim 9 wherein the starting pixel s is selected according to a corresponding gradient magnitude.

11. The method of claim 7 wherein clustering of the non-branched edges further comprises connecting any two non-branched edges if the distance of respective end pixels is within a distance threshold.

12. The method of claim 7 wherein clustering of the non-branched edges further comprises removing any non-branched edge if a corresponding edge length is shorter than a length threshold.

13. The method of claim 7 wherein clustering of the non-branched edges further comprises dividing any non-branched edge if a corresponding edge length is greater than a length threshold.

14. The method of claim 7 wherein transforming of the non-branched edges into curves further comprises the steps of:
   sampling points from the non-branched edges; and
   drawing the curves using the sample points as control points.

15. The method of claim 14 wherein the points are sampled according to a sample frequency.

16. The method of claim 7 wherein the footprints have a fixed or variable size.

17. A machine-readable storage medium storing a computer program which when executed causes a computer to perform an edge detection method, the method comprising the steps of:
  detecting edge pixels of an image;
  tracing the connected edge pixels to generate non-branched edges; and
  clustering the non-branched edges,
  wherein tracing of non-branched edges further comprises the steps of:
  selecting a starting pixel s from the edge pixels E;
  removing the starting pixel s from the edge pixels E, adding the starting pixel s to a container EPList with an initial marking value M(s)=0, and setting a maximum marking value Max(M)=M(S);
  for each pixel p in the container EPList,
  checking each connected pixel p' of the pixel p;
  removing the connected pixel p' from the edge pixels E; adding the connected pixel p' to the container EPList with a marking value M(p')=M(p)+1, and setting the maximum marking value Max(M)=M(p') if the connected pixel p' is in the edge pixels E; and
  repeating checking and removal for each pixel p until all pixels in the container EPList are processed;
  checking the last pixel p from the container EPList, removing the pixel p from the container EPList if M(p)<Max(M), and repeating checking and removal for each pixel p until M(p)=Max(M); and
  checking the next pixel p' of the pixel p from the container EPList in the backward order, removing the pixel p' from the container EPList if M(p')≠Max(p)−1 , and repeating checking and removal for each pixel p' until the next pixel is the first pixel in the container EPList.

18. The storage medium of claim 17 wherein the method further comprises the steps of:
  transforming the non-branched edges into curves; and
  drawing the curves with a series of footprints to generate contour strokes of the image.

* * * * *